(12) United States Patent
Erickson et al.

(10) Patent No.: US 8,801,370 B2
(45) Date of Patent: Aug. 12, 2014

(54) TURBINE CASE IMPINGEMENT COOLING FOR HEAVY DUTY GAS TURBINES

(75) Inventors: Dean Matthew Erickson, Simpsonville, SC (US); Hua Zhang, Greer, SC (US); Jason Seale, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1485 days.

(21) Appl. No.: 11/548,791

(22) Filed: Oct. 12, 2006

(65) Prior Publication Data
US 2008/0089780 A1   Apr. 17, 2008

(51) Int. Cl.
*F01D 11/16*   (2006.01)
*F01D 25/14*   (2006.01)
*F01D 11/24*   (2006.01)

(52) U.S. Cl.
CPC .............. *F01D 11/24* (2013.01); *F01D 25/14* (2013.01); *Y02T 50/676* (2013.01); *F05D 2260/201* (2013.01)
USPC .......................... 415/173.1; 416/116; 416/176

(58) Field of Classification Search
USPC .......................... 415/173.1, 176, 116; 416/198
See application file for complete search history.

(56) References Cited

U.S. PATENT DOCUMENTS

| | | | |
|---|---|---|---|
| 2,650,753 A * | 9/1953 | Howard et al. ................ | 415/137 |
| 3,966,354 A | 6/1976 | Patterson | |
| 4,251,185 A * | 2/1981 | Karstensen ................... | 415/136 |
| 4,279,123 A * | 7/1981 | Griffin et al. ................. | 60/226.1 |
| 4,337,016 A | 6/1982 | Chaplin | |
| 4,338,061 A | 7/1982 | Beitler et al. | |
| 4,573,806 A | 3/1986 | Moore et al. | |
| 4,826,397 A | 5/1989 | Shook et al. | |
| 4,928,240 A | 5/1990 | Davison et al. | |
| 5,012,420 A | 4/1991 | Walker et al. | |
| 5,100,291 A | 3/1992 | Glover | |
| 5,116,199 A * | 5/1992 | Ciokajlo .................... | 415/173.2 |
| 5,160,241 A | 11/1992 | Glynn | |
| 5,205,115 A * | 4/1993 | Plemmons et al. ............. | 60/806 |
| 5,281,085 A * | 1/1994 | Lenahan et al. .............. | 415/116 |
| 5,399,066 A * | 3/1995 | Ritchie et al. ................. | 415/115 |
| 5,478,214 A * | 12/1995 | Howarth et al. ........... | 417/423.5 |
| 5,540,547 A * | 7/1996 | Cole ............................. | 415/177 |

(Continued)

FOREIGN PATENT DOCUMENTS

EP   0492865 A1   7/1992
EP   0541325 A1   5/1993

(Continued)

OTHER PUBLICATIONS

Non-Final Office Action for U.S. Appl. No. 11/626,481 mailed on Jan. 6, 2010.

(Continued)

*Primary Examiner* — Ninh H Nguyen
(74) *Attorney, Agent, or Firm* — Sutherland Asbill & Brennan LLP

(57) ABSTRACT

A impingement cooling system for heavy duty turbines that includes a manifold affixed to a casing of the heavy-duty turbine, wherein the manifold includes a plurality of impingement holes in the surface of the manifold and a blower that provides air flow across the plurality of impingement holes of the manifold to cool the casing of the heavy-duty turbine to control the clearance between a tip of a turbine blade and a shroud of the heavy-duty turbine.

12 Claims, 6 Drawing Sheets

(56) References Cited

U.S. PATENT DOCUMENTS

| | | | |
|---|---|---|---|
| 5,685,693 A * | 11/1997 | Sexton et al. | 415/173.1 |
| RE35,674 E | 12/1997 | Pustell | |
| 6,431,824 B2 | 8/2002 | Schotsch et al. | |
| 6,435,823 B1 * | 8/2002 | Schroder | 415/173.1 |
| 6,454,529 B1 * | 9/2002 | Zearbaugh et al. | 415/173.2 |
| 6,477,843 B2 * | 11/2002 | Schroeder et al. | 60/772 |
| 6,487,491 B1 | 11/2002 | Karpman et al. | |
| 6,615,588 B2 * | 9/2003 | Hoecker | 60/752 |
| 6,997,673 B2 | 2/2006 | Morris et al. | |
| 7,293,953 B2 * | 11/2007 | Leach et al. | 415/14 |
| 2001/0022137 A1 * | 9/2001 | Colson | 95/273 |
| 2008/0193278 A1 | 8/2008 | Erickson et al. | |
| 2009/0068007 A1 | 3/2009 | Erickson et al. | |
| 2010/0034635 A1 | 2/2010 | Erickson et al. | |

FOREIGN PATENT DOCUMENTS

| | | | |
|---|---|---|---|
| EP | 0821134 | A1 | 1/1998 |
| EP | 1148220 | A2 | 10/2001 |
| EP | 1180577 | A2 | 2/2002 |
| EP | 1512844 | A2 | 9/2005 |
| JP | 51-086615 | A | 7/1976 |
| JP | 59-173527 | A | 10/1984 |
| JP | 59173527 | A | 10/1984 |
| JP | 63-154806 | A | 6/1988 |
| JP | 02-49903 | A | 2/1990 |
| JP | 04-301102 | A | 10/1992 |
| JP | 11-062619 | A | 3/1993 |
| JP | 08-334034 | A | 12/1996 |
| JP | 2001-303971 | A | 10/2001 |
| JP | 2005-083199 | A | 3/2005 |

OTHER PUBLICATIONS

Notice of Final Rejection from Japanese Patent Office.
Search Report and Written Opinion from EP Application No. 07254047.9 dated Nov. 30, 2012.

* cited by examiner

TURBINE CASE IMPINGEMENT COOLING FOR HEAVY DUTY GAS TURBINES

BACKGROUND OF THE INVENTION

Air impingement cooling has been used to manage the casing temperature of small gas turbines and to reduce and maintain the clearances between rotating blades and accompanying interior casing surfaces. One problem for air impingement cooling systems on heavy-duty gas turbines is the ability to achieve a uniform heat transfer coefficient across large non-uniform non-standard casing surfaces. On small gas turbines, small impingement holes and short nozzle to surface distances are normally applied. These factors produce the required higher heat transfer coefficients on the casing. One detrimental impact of applying small of impingement cooling holes is the need for operating with high differential pressure drop across the holes. This results in the requirement for undesirable high cooling air supply pressures which negatively impacts net efficiency.

Impingement cooling has been applied to aircraft engines as a method of turbine clearance control. However, the impingement systems used on aircraft engines cannot be used in heavy-duty turbine applications. The systems applied to aircraft engines utilize air extracted from the compressor as the cooling medium. It is not feasible to use compressor extraction air on heavy-duty gas turbines because the design heat transfer coefficients require cooler air temperatures. Heavy-duty gas turbines have a significantly larger, non-uniform casing surface that requires an intricate manifold design as compared to aircraft engines. Also, the casing thickness and casing thickness variations are considerably greater on heavy-duty gas turbines.

Currently there is a need in the art for an impingement cooling system that can provide clearance control on heavy-duty gas turbines. It is essential that this system properly delivers the required heat transfer coefficient to the targeted casing surface, and properly controls the flow of air to the casing.

DETAILED DESCRIPTION OF THE INVENTION

The present invention now will be described more fully hereinafter with reference to the accompanying drawings, in which exemplary embodiments of the invention are shown. This invention may, however, be embodied in many different forms and should not be construed as being limited to the embodiments set forth herein; rather, these embodiments are provided so that this disclosure will be thorough and complete, and will convey the scope of the invention to those skilled in the art.

Figure 1:
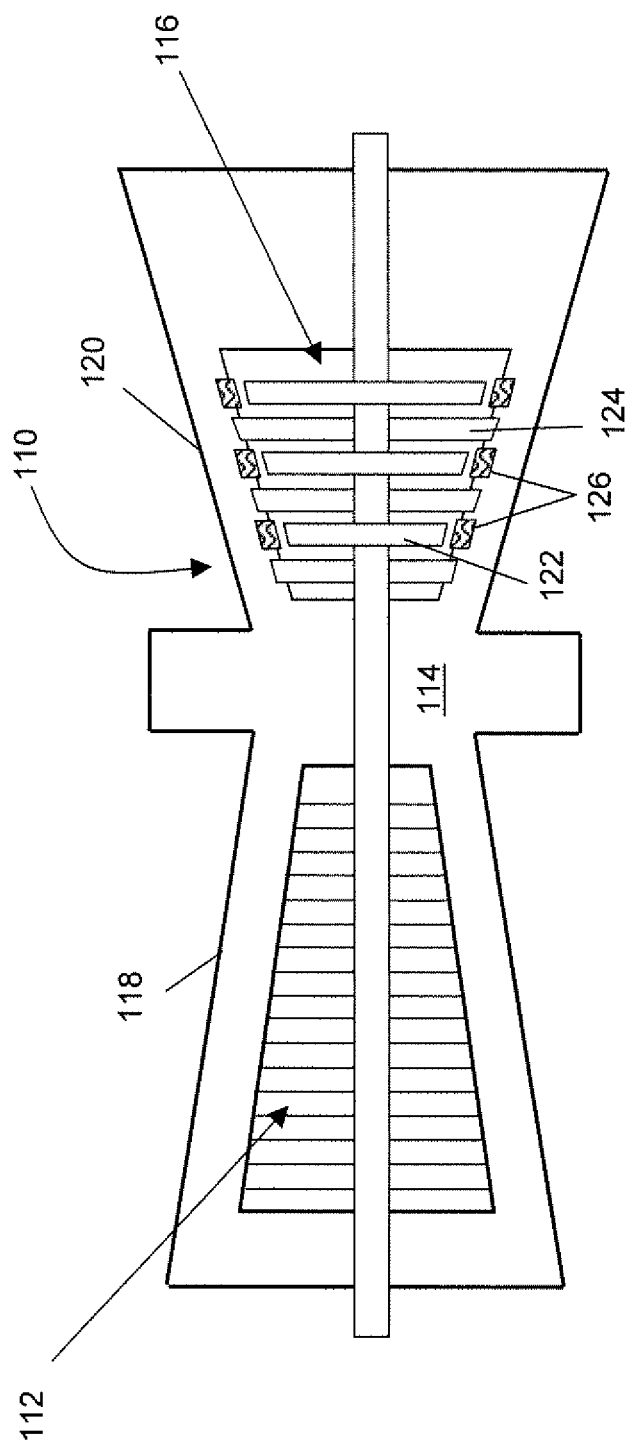
FIG. 1 is a cross-sectional view of a heavy duty gas turbine according to the embodiment of the invention.

FIG. 1 illustrates an exemplary embodiment of a heavy-duty turbine 110. The heavy-duty turbine engine includes a compressor section 112, combustor section 114, and a turbine section 116. The turbine 110 also includes a compressor casing 118 and a turbine casing 120. The turbine and compressor casings 118, 120 enclose major parts of the heavy-duty turbine. The turbine section 116 includes a shaft and a plurality of sets of rotating and stationary turbine blades.

Referring to FIG. 1, the turbine casing 120 may include a shroud 126 affixed to the interior surface of the casing 120. The shroud 126 may be positioned proximate to the tips of the rotating turbine blades 122 to minimize air leakage past the blade tip 123. The distance between the blade tip 123 and the shroud 126 is referred to as the clearance 128. It is noted that the clearances 128 of each turbine stage are not consistent due to the different thermal growth characteristics of the blades and casing.

Figure 2:
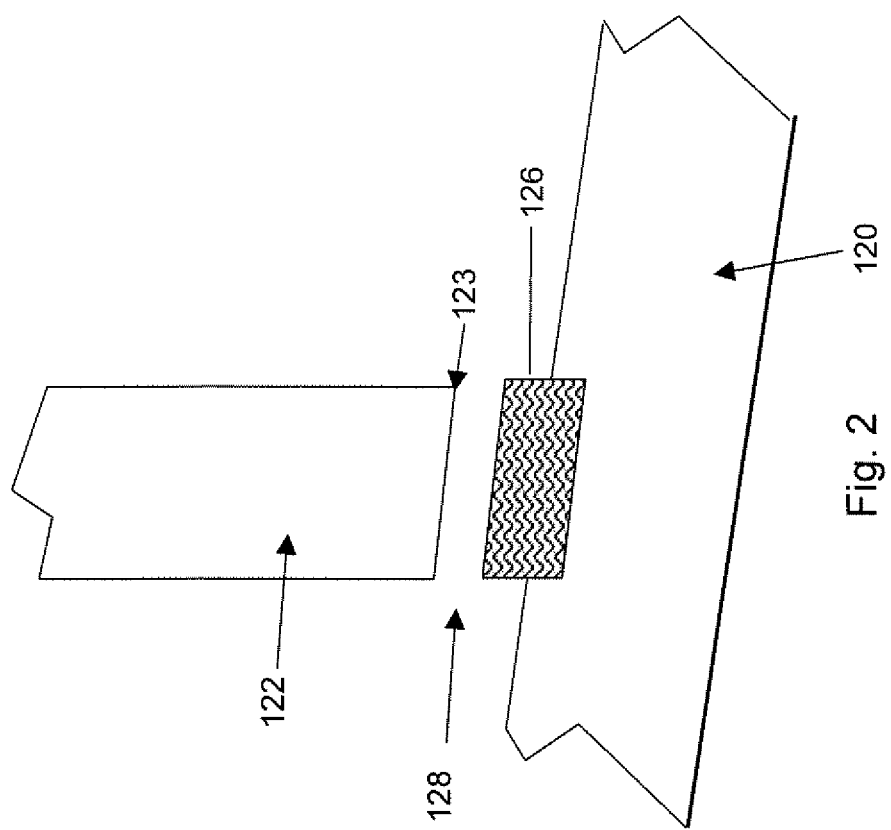
FIG. 2 is a close-up view of the turbine blade to shroud clearance according to the embodiment of the invention.

A key contributor in the efficiency of heavy-duty gas turbines is the amount of air/exhaust gas leakage through the blade tip 123 to casing clearance 128. FIG. 2 illustrates an exemplary embodiment of the clearance 128 between the turbine blade tips 123 and the shroud 126 in the turbine casing 120. Due to the different thermal growth characteristics of the turbine blade tip 123 and turbine casing 120, clearances 128 significantly change as the turbine transitions through transients from ignition to a base-load steady state condition. A clearance control system, including its operating sequence may be implemented to address the specific clearance characteristics during all operating conditions. Incorrect design and/or sequencing of the control system may lead to excessive rubbing of the turbine blade tips 123 with the casing shrouds 126, which can result in increased clearances and reduced performance.

Figure 3:
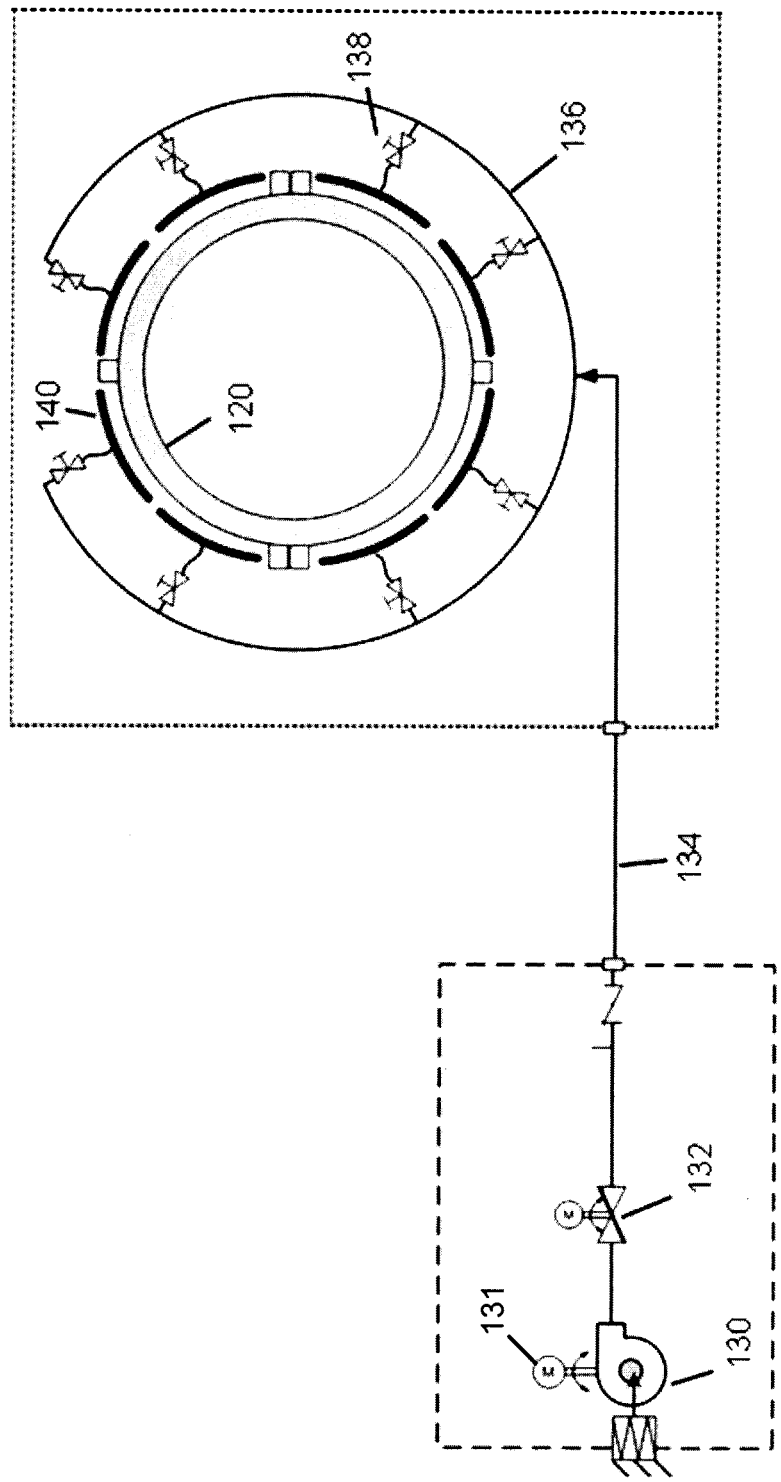
FIG. 3 is an impingement cooling system according to the embodiment of the invention.

As illustrated in the exemplary embodiment of FIG. 3, an impingement air-cooling system 200 may be used to reduce and maintain the clearances between the turbine shroud 126 and the accompanying blade tip 123. Referring to FIG. 3, the impingement air-cooling system 200 may consist of a blower 130, a motor 131, a flow control damper 132, interconnect piping 134, a distribution header 136, flow metering valves or orifices 138 and into a series impingement cooling manifolds 140. The impingement cooling manifold is affixed to the turbine casing. In the exemplary embodiment of FIG. 3, a plurality of impingement manifolds 140 are affixed about the circumference of the turbine casing 120. The impingement cooling blower 130 takes suction from ambient air and blows the air through the flow control damper 132, interconnect piping 134, distribution header 136, flow metering valves or orifices 138 and into the impingement cooling manifolds 140. The blower 130 may be any blowing device including a fan or a jet. The impingement cooling manifold 140 insures a uniform heat transfer coefficient is delivered to the turbine casing 120. It should be appreciated that the impingement air-cooling system is not limited to the components disclosed herein but may include any components that enables air to pass along the impingement cooling manifolds.

Figure 4:
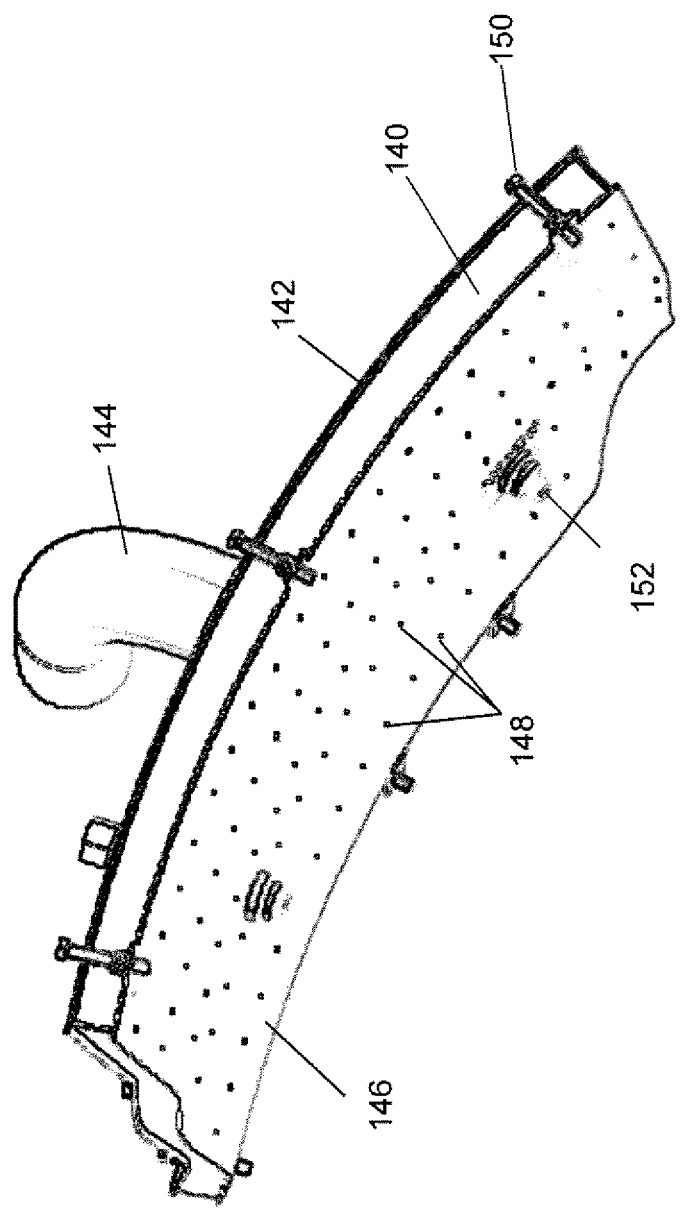
FIG. 4 is a perspective view of a impingement cooling manifold according to the embodiment of the invention.
Figure 5:
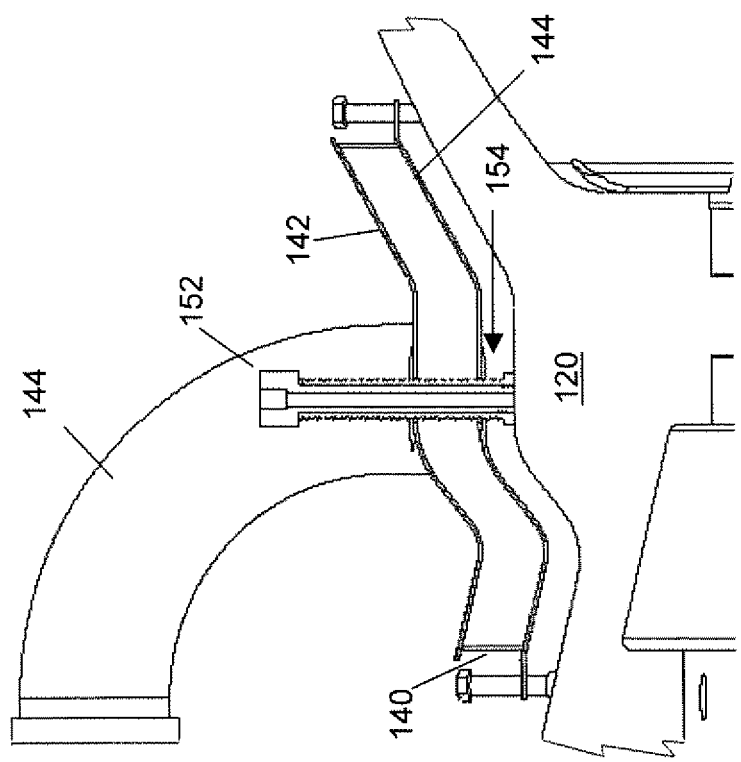
FIG. 5 is a cross-section view of an impingement cooling manifold according to the embodiment of the invention.

Referring to the exemplary embodiment illustrated in FIGS. 4 and 5, the impingement cooling manifolds 140 may be designed to the contours of the target area of the turbine casing 120. Each impingement cooling manifold 140 may include an upper plate 142 with feed pipe 144, a lower plate 146 with multiple impingement holes 148, side pieces, support legs 150 and hold-down supports 152. The impingement holes 148 permit the air to flow from the impingement cooling manifold to the turbine casing to selectively cool the turbine casing.

The impingement holes 148 are positioned in an array. In an exemplary embodiment, the impingement holes 148 may be spaced in the range from 1.25 to 2.5 inches. In an exemplary embodiment, the individual impingement holes 148 may be sized between 0.12 and 0.2 inches. The varying hole sizes and spacing are required to compensate for the non-uniformity of the turbine casing geometry. The size and positioning of the impingement holes 148 on the lower plate 146 produce a uniform heat transfer coefficient across the casing targeted by the impingement air-cooling system. However, the impingement holes are not limited to these sizes or spacings. The distance between the upper 142 and lower plates 146 also may be dimensioned to minimize internal pressure variations, which results in uniform cooling hole pressure ratios.

The gap distance between impingement cooling manifold lower plates 146 and the turbine casing 120 effects the heat transfer coefficient. Too large of a gap can result in a non-optimum heat transfer coefficient. Too little of a gap can result in both non-optimum and a non-uniform heat transfer coefficient. In an exemplary embodiment, a gap of between 0.5 and 1.0 inch provides a suitable heat transfer coefficient. However, the gap in not limited to this range and may be any distance that provides a suitable heat transfer coefficient.

Figure 6:
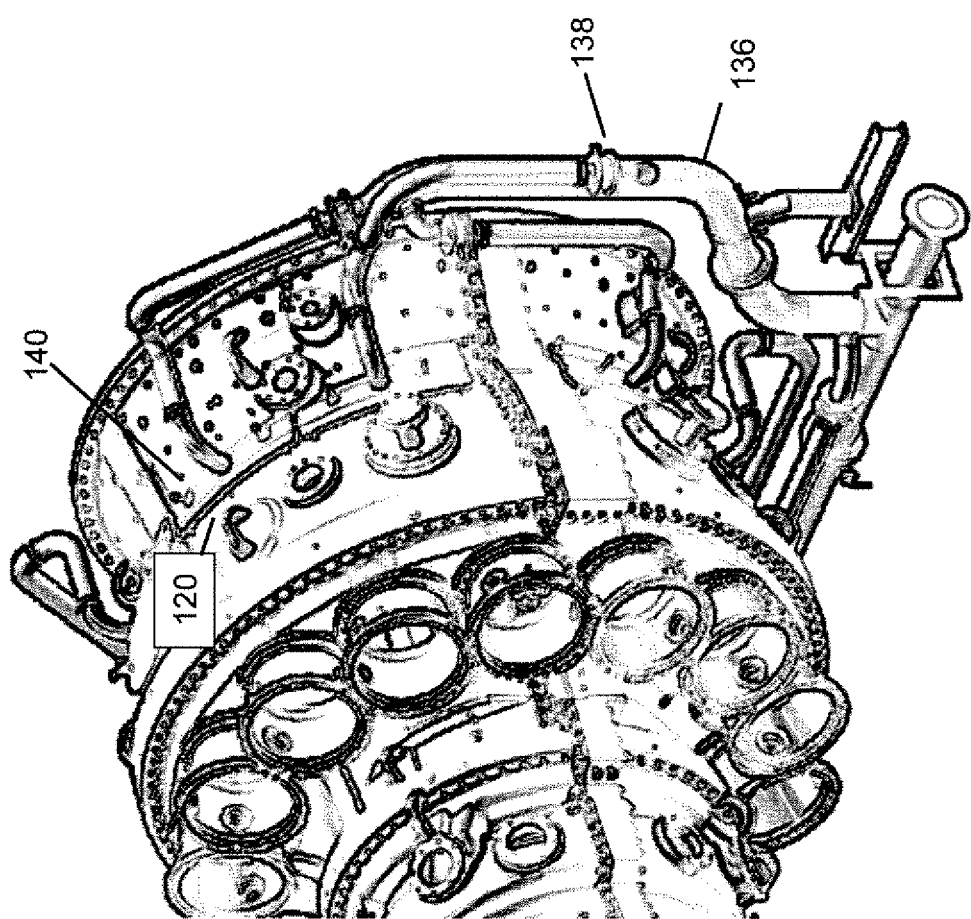
FIG. 6 is a perspective view of installed impingement cooling manifolds on a turbine casing according to the embodiment of the invention.

As illustrated in FIG. 6, the multiple impingement cooling manifolds 140 are affixed to the casing 120 of the turbine directly above target cooling area. The impingement cooling manifolds 140 are positioned such that there is ample spacing between their edges and any protrusions off of the casing. This provides a free path for the air passing through the impingement holes 148 to exhaust from under the impingement cooling manifold 140 to the environment. In an exemplary embodiment, the spacing between two adjacent impingement cooling manifolds may be between 1 to 30 inches and is dependent on casing protrusions and flanged joints. The spacing are not limited to these dimensions and may be spaced at any suitable distance. The impingement cooling manifolds 140 also may provide impingement cooling to any of the axial flanges, including the horizontal split joint.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in generic and descriptive sense only and not for purposes of limitation.

The invention claimed is:

1. An impingement cooling system for heavy duty land-based turbines comprising:
   an open impingement cooling manifold affixed to a non-uniform casing of the heavy-duty turbine, wherein the impingement cooling manifold comprises a plurality of impingement holes in the surface of the impingement cooling manifold;
   the manifold being positioned about a turbine blade and a shroud of the heavy duty turbine; and
   a motor driven blower in direct communication with ambient air that provides ambient air flow across the plurality of impingement holes of the impingement cooling manifold to cool the casing of the heavy-duty turbine to control a clearance between a tip of the turbine blade and the shroud of the heavy-duty turbine before exhaust to the ambient.

2. The system of claim 1 wherein the impingement cooling manifold comprises an upper plate and a lower plate positioned at a distance to provide substantially uniform pressure ratios across the plurality of holes.

3. The system of claim 2, wherein the plurality of impingement holes are located on the lower plate of the impingement cooling manifold.

4. The system of claim 1 wherein the plurality of holes are positioned as a uniform array across the impingement cooling manifold.

5. The system of claim 1 wherein the plurality of holes are positioned as a non-uniform array across the impingement cooling manifold.

6. The system of claim 1 wherein the plurality of holes are uniform in diameter.

7. The system of claim 1 wherein the plurality of holes are non-uniform in diameter.

8. The system of claim 1 wherein the plurality of holes are chosen from a shape consisting of substantially round, oval, elliptical, square, triangular, and rectangular.

9. The system of claim 1 wherein the blade of a turbine comprises a rotary blade.

10. The system of claim 1 wherein the impingement cooling manifold comprises a plurality of impingement cooling manifolds positioned around the circumference of the casing of the heavy-duty turbine.

11. The system of claim 1 further comprising a gap between the impingement cooling manifold and the casing of the heavy-duty turbine.

12. An impingement cooling system for heavy duty land-based turbines comprising:
   a plurality of open manifolds affixed to a non-uniform casing of the heavy-duty turbine, wherein the plurality of manifolds comprise a plurality of holes in the surface of the plurality of manifolds;
   the plurality of manifolds being positioned about a plurality of turbine blades and a plurality of shrouds of the heavy duty turbine; and
   a motor driven blower in direct communication with the ambient air that provides ambient air flow across the plurality of holes of the plurality of manifolds to cool the casing of the heavy-duty turbine to increase a plurality of clearances between the plurality of tips of a plurality of turbine blades and the plurality of shrouds of the heavy-duty turbine before exhaust to the ambient.

* * * * *